US008897781B2

(12) United States Patent
Ono

(10) Patent No.: US 8,897,781 B2
(45) Date of Patent: Nov. 25, 2014

(54) METHOD OF MANAGING MOBILE COMMUNICATION SYSTEM AND MONITORING CONTROL APPARATUS

(75) Inventor: Mitsuhiro Ono, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 13/529,392

(22) Filed: Jun. 21, 2012

(65) Prior Publication Data

US 2013/0012187 A1 Jan. 10, 2013

(30) Foreign Application Priority Data

Jul. 5, 2011 (JP) .................................. 2011-149595

(51) Int. Cl.
*H04Q 7/20* (2006.01)
*H04W 24/02* (2009.01)
*H04B 7/04* (2006.01)
*H04B 7/06* (2006.01)

(52) U.S. Cl.
CPC ............ *H04W 24/02* (2013.01); *H04B 7/0413* (2013.01); *Y02B 60/50* (2013.01); *H04B 7/0691* (2013.01)
USPC ........... 455/436; 455/444; 455/443; 455/451; 455/450; 455/452.2

(58) Field of Classification Search
USPC ........................................... 455/436, 442, 68
See application file for complete search history.

(56) References Cited

U.S. PATENT DOCUMENTS

2010/0029281 A1* 2/2010 Watanabe ...................... 455/436
2011/0105049 A1* 5/2011 Yamada et al. .................. 455/68

FOREIGN PATENT DOCUMENTS

| JP | 2000-197107 | 7/2000 |
| JP | 2003-29142 | 1/2003 |
| JP | 2006-333504 | 12/2006 |

* cited by examiner

*Primary Examiner* — Charles Appiah
*Assistant Examiner* — Randy Peaches
(74) *Attorney, Agent, or Firm* — Katten Muchin Rosenman LLP

(57) ABSTRACT

A method for managing a mobile communication system in which a base station and a mobile station communicate with each other, the method includes: stopping, among cells of a plurality of base stations, operation of a cell whose amount of use of communication is smaller than a reference value; and operating, among the cells of the plurality of base stations, a cell whose amount of use of communication is larger than the reference value using a high-order multi-input and multi-output configuration in which a plurality of antennas are used for transmission.

12 Claims, 13 Drawing Sheets

METHOD OF MANAGING MOBILE COMMUNICATION SYSTEM AND MONITORING CONTROL APPARATUS

CROSS-REFERENCE TO RELATED APPLICATION(S)

This application is based upon and claims the benefit of priority of the prior Japanese Patent Application No. 2011-149595, filed on Jul. 5, 2011, the entire contents of which are incorporated herein by reference.

FIELD

The embodiment discussed herein is related to a method of managing a mobile communication system, and a monitoring control apparatus.

BACKGROUND

In a mobile communication system, a base station and a mobile station communicate with each other. The base station may have large coverage and a large throughput, for example, a large amount of data transferred in unit time. Therefore, for example, the output power of the base station in downlink may be set to be large. Because a control signal is transmitted even when the amount of use of communication, for example, the amount of data transferred is small, the output power may not become small.

The related art is discussed in Japanese Laid-open Patent Publication No. 2000-197107 and other publications.

SUMMARY

According to one aspect of the embodiments, a method for managing a mobile communication system in which a base station and a mobile station communicate with each other, the method includes: stopping, among cells of a plurality of base stations, operation of a cell whose amount of use of communication is smaller than a reference value; and operating, among the cells of the plurality of base stations, a cell whose amount of use of communication is larger than the reference value using a high-order multi-input and multi-output configuration in which a plurality of antennas are used for transmission.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In code division multiple access (CDMA) cellular wireless base stations using a base station antenna diversity method, at least one of two antennas that cover the same sector may control the transmission power for communication from the base stations to mobile stations in accordance with the state of the traffic in the sector.

When the traffic of each base station becomes large, a base station apparatus increases the transmission power corresponding to channels that are used at the same time and executes transmission. Therefore, the reception quality of the mobile stations may deteriorate.

By decreasing the number of mobile stations stored in one sector by decreasing the transmission power of the base stations, a communication path may be secured. The energy may be decreased, and the efficiency may be decreased because of the decrease in the number of mobile stations stored in one sector.

Figure 1:
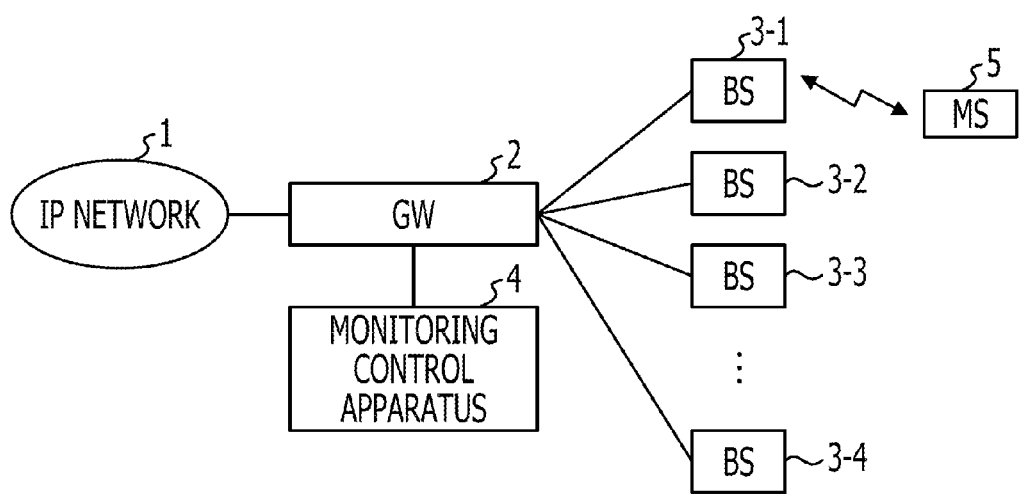
FIG. 1 illustrates an exemplary mobile communication system.

FIG. 1 illustrates an exemplary mobile communication system. A gateway (GW) 2 is coupled to a network 1, and base stations (BSs) 3-1 to 3-n are coupled downstream to the gateway 2. A monitoring control apparatus 4 that monitors and controls the base stations 3-1 to 3-n is coupled to the gateway 2. The monitoring control apparatus 4 detects the operation states of the base stations 3-1 to 3-n and controls the base stations 3-1 to 3-n.

The base stations 3-1 to 3-n wirelessly communicate with a mobile station (MS) 5. In downlink between the base stations 3-1 to 3-n and the mobile station 5 and the like, the wireless communication may be executed using a combination between MIMO spatial multiplexing, orthogonal frequency-division multiplexing (OFDM), and orthogonal frequency-division multiple access (OFDMA), which is collectively called a MIMO-OFDM method.

The frequency bands used by all cells included in the base stations 3-1 to 3-n may be substantially the same. A method for correcting an error may be adopted, so that a coverage hole is not caused between the cells even if a cell interferes with another cell. In the mobile communication system, the MIMO-OFDM method or the MIMO spatial multiplexing method may be used.

Figure 2:
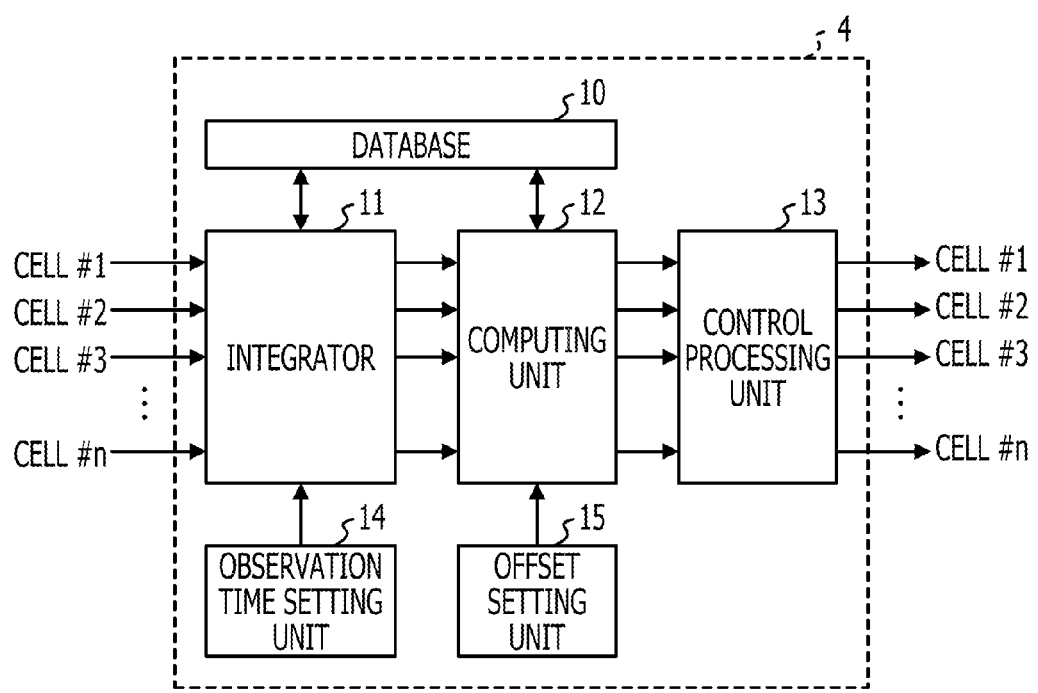
FIG. 2 illustrates an exemplary monitoring control apparatus.

FIG. 2 illustrates an exemplary monitoring control apparatus. The monitoring control apparatus illustrated in FIG. 2 may be the monitoring control apparatus 4 illustrated in FIG. 1. The monitoring control apparatus 4 illustrated in FIG. 2 includes a database 10, an integrator 11, a computing unit 12, a control processing unit 13, an observation time setting unit 14, and an offset setting unit 15. The database 10 holds data transmitted from the base stations 3-1 to 3-n including cells #1 to #n, such as the amounts of use of communication, for a certain period of time. The amounts of use of communication may be, for example, the amounts of data transferred, for example, the throughputs, the numbers of customers who are communicating, or the like. The period of time for which the data is held by the database 10 may be a period sufficiently longer than an observation time $T_o$ (the observation time $T_o$ is several minutes to tens of minutes).

The integrator 11 integrates the amounts of use of communication transmitted from the base stations 3-1 to 3-$n$ including the cells #1 to #n, respectively, for each cell for the observation time $T_o$ to obtain the integrated amounts of use of each cell. The observation time $T_o$ may be set by the observation time setting unit 14. The monitoring control apparatus 4 may not integrate the amounts of use of communication, and each station may execute integration and transmit the result of the integration. In this case, the integrator 11 may not be provided. However, it may be more effective when the monitoring control apparatus 4 integrates the amounts of use of communication than when each base station transmits the result of asynchronous integration.

The computing unit 12 arranges adjacent cells as a group, calculates an average value of the integrated amounts of use of the cells in the group, and then determines the MIMO operation mode of each cell using the average value, an offset value α, and the like. The offset value α may be set by the offset setting unit 15. The control processing unit 13 generates MIMO control signals for setting, for the base stations 3-1 to 3-$n$ including the cells #1 to #n, respectively, the MIMO operation modes of the cells transmitted from the computing unit 12 and transmits the MIMO control signals to the base stations 3-1 to 3-$n$.

Figure 3:
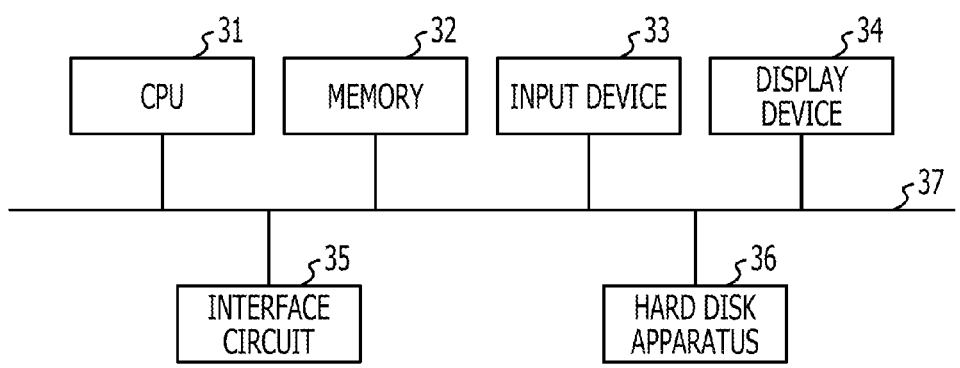
FIG. 3 illustrates an exemplary monitoring control apparatus.

FIG. 3 illustrates an exemplary monitoring control apparatus. The configuration illustrated in FIG. 3 may be the hardware configuration of the monitoring control apparatus 4 illustrated in FIG. 2. For example, the monitoring control apparatus 4 illustrated in FIG. 3 includes a central processing unit (CPU) 31, a memory 32, an input device 33, a display device 34, an interface circuit 35, and a hard disk device 36. The CPU 31 to the hard disk device 36 are coupled to one another by a bus 37.

The CPU 31 may execute various programs stored in the memory 32. For example, the CPU 31 may execute the process of the integrator 11 by executing a program for an integration process and the process of the computing unit 12 by executing a program for a grouping process or a process for determining the MIMO operation mode. The CPU 31 may execute the process of the control processing unit 13 by executing a program for a control process. The CPU 31 may execute the process of the observation time setting unit 14 by executing a program for a process for setting the observation time $T_o$ and the process of the offset setting unit 15 by executing a program for a process for setting the offset. The CPU 31 may execute the process of the database 10 by executing a program for a database process using the hard disk drive 36.

The input device 33 receives, for example, information from a manager and supplies the input information to the CPU 31. The display device 34 displays the operation state of the monitoring control apparatus 4 and the like for the manager under the control executed by the CPU 31. The interface circuit 35 transmits and receives information to and from the gateway 2.

Figure 4:
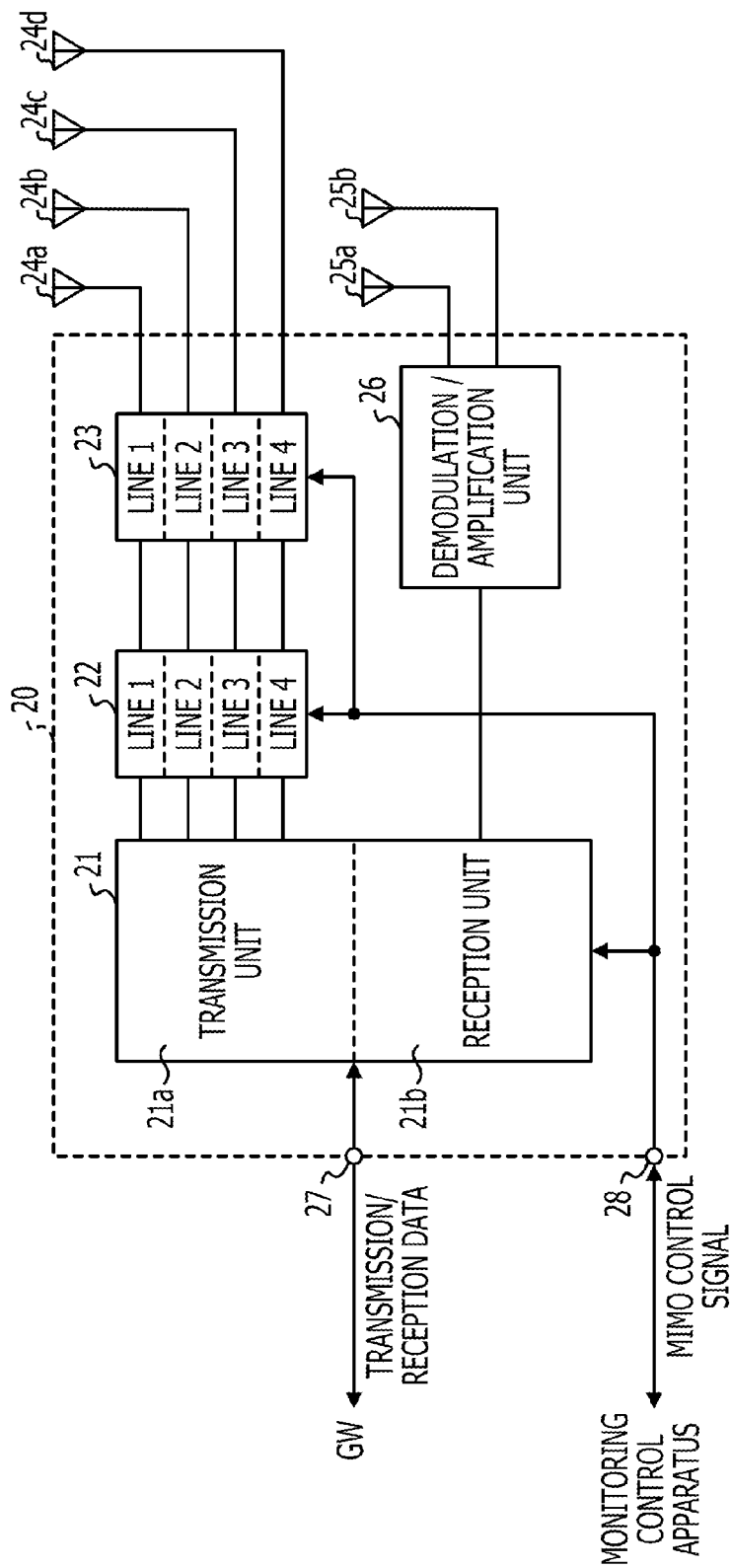
FIG. 4 illustrates an exemplary base station.

FIG. 4 illustrates an exemplary base station. The base station illustrated in FIG. 4 may correspond to each of the base stations 3-1 to 3-$n$ illustrated in FIG. 1. A base station apparatus 20 illustrated in FIG. 4 includes a data transmission/reception unit 21, a data distribution unit 22, a modulation/amplification unit 23, transmission antennas 24$a$, 24$b$, 24$c$, and 24$d$, reception antennas 25$a$ and 25$b$, and a demodulation/amplification unit 26.

A terminal 27 is coupled to the gateway 2, and transmission data input from the gateway 2 is supplied to a transmission unit 21$a$ of the data transmission/reception unit 21. Reception data output from a reception unit 21$b$ of the data transmission/reception unit 21 is supplied from the terminal 27 to the gateway 2. A terminal 28 is coupled to the monitoring control apparatus 4, and a MIMO control signal input from the monitoring control apparatus 4 is supplied to the data transmission/reception unit 21, the data distribution unit 22, and the modulation/amplification unit 23.

The transmission unit 21$a$ may execute a process including encoding of the transmission data. The data after the process is supplied to the data distribution unit 22, which is divided into lines 1 to 4, based on the MIMO control signal. The lines 1 to 4 of the data distribution unit 22 supply the data after the process to the modulation/amplification unit 23, which is also divided into lines 1 to 4, based on the MIMO control signal. The lines 1 to 4 of the modulation/amplification unit 23 modulate and amplify the supplied data and transmit the data from the transmission antennas 24$a$ to 24$d$, respectively.

In accordance with the control under the MIMO control signal, transmission in a first-order MIMO configuration (1-MIMO configuration), in which a single transmission antenna, for example, the transmission antenna 24$a$, is used, transmission in a second-order MIMO configuration (2-MIMO configuration), in which two transmission antennas, for example, the transmission antennas 24$a$ and 24$b$, are used, or transmission in a fourth-order MIMO configuration (4-MIMO configuration), in which four transmission antennas, for example, the transmission antennas 24$a$, 24$b$, 24$c$, and 24$d$, are used, may be executed. The reception antennas 25$a$ and 25$b$ may be designed in such a way as to also serve as transmission antennas.

The demodulation/amplification unit 26 executes, using the reception antennas 25$a$ and 25$b$, diversity reception of a signal transmitted from a mobile station, and demodulates the received signal. The demodulated signal is supplied to the reception unit 21$b$ of the data transmission/reception unit 21 and subjected to various processes including decoding. The received data is supplied from the terminal 27 to the gateway 2.

Figure 5:
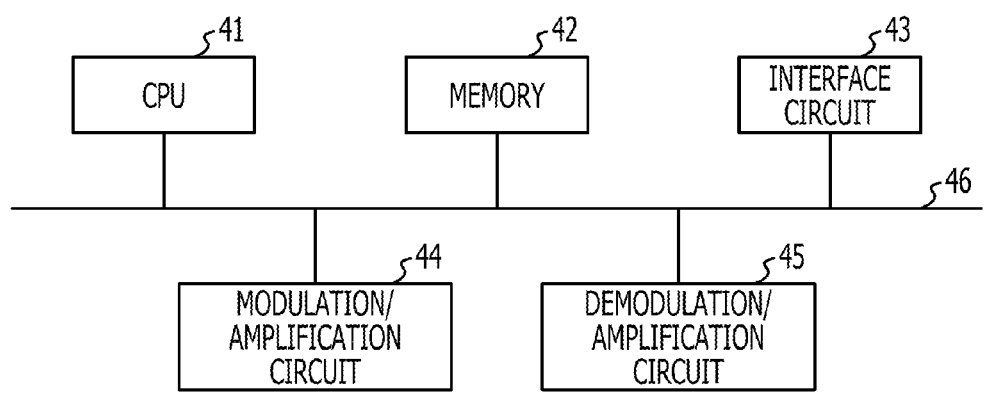
FIG. 5 illustrates an exemplary base station.

FIG. 5 illustrates an exemplary base station apparatus. The configuration illustrated in FIG. 5 may be a hardware configuration of the base station apparatus. The base station apparatus 20 illustrated in FIG. 5 includes a CPU 41, a memory 42, an interface circuit 43, a modulation/amplification circuit 44, and a demodulation/amplification circuit 45. The CPU 41 to the demodulation/amplification circuit 45 are coupled to one another by a bus 46. The CPU 41 and the modulation/amplification circuit 44 or the demodulation/amplification circuit 45 may be coupled by a dedicated line other than the bus 46.

The CPU 41 executes various programs stored in the memory 42. For example, the CPU 41 may execute the process of the transmission unit 21$a$ by executing programs for various processes including encoding and the process of the data distribution unit 22 by executing a program for a process for distributing data. The CPU 41 may execute the process of the reception unit 21$b$ by executing programs for various processes including decoding.

The interface circuit 43 transmits and receives information to and from the gateway 2. The modulation/amplification circuit 44 illustrated in FIG. 5 may correspond to the modulation/amplification unit 23 illustrated in FIG. 4. The demodulation/amplification circuit 45 illustrated in FIG. 5 corresponds to the demodulation/amplification unit 26 illustrated in FIG. 4.

Figure 6:
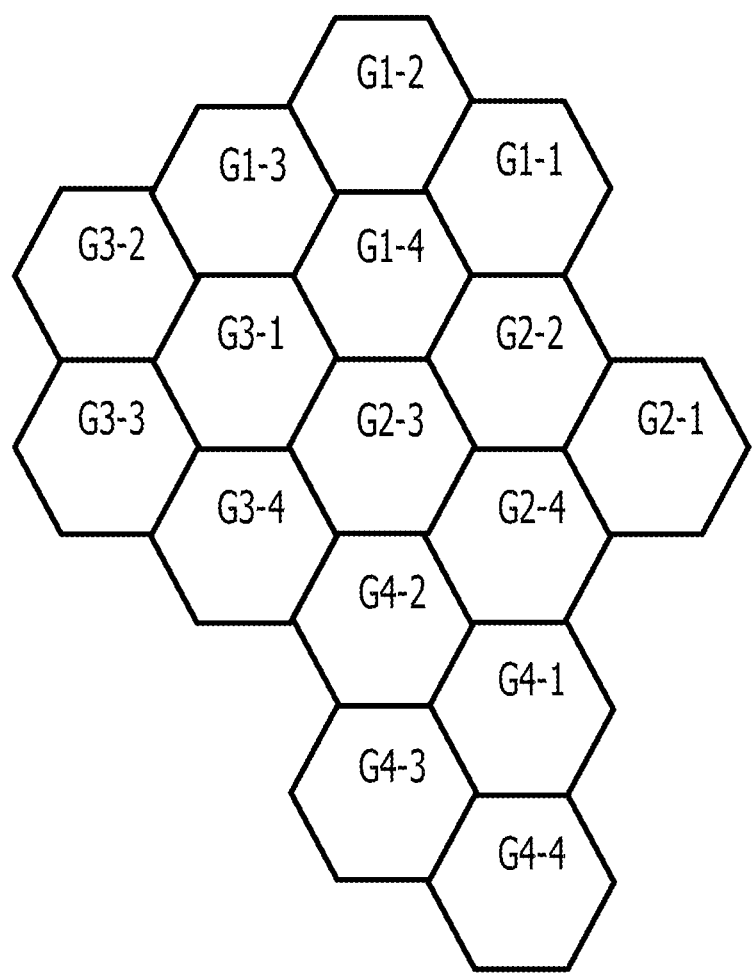
FIG. 6 illustrates an exemplary arrangement of base stations.

FIG. 6 illustrates an exemplary arrangement of base station apparatuses. In FIG. 6, arrangement of base station apparatuses in which a plurality of cells are located adjacent to one another is illustrated. Each of hexagons located adjacent to one another corresponds to a cell, which is coverage of a single base station, and there is a base station at the center of each cell. Each base station may form or cover a cell using an omnidirectional antenna (non-directional antenna) in one sector.

In FIG. 6, sixteen cells G1-1 to G4-4 are illustrated. When the efficiency of the management of the base stations is to be increased using these sixteen cells, operation of base stations whose amounts of use of communication are small may be stopped (turned off) in units of groups. The base stations whose operation is to be stopped may be selected and the base stations may be operated efficiently. In a city or a suburban area, the base stations may be arranged such that the coverage of each base station is set to be small, for example, set as a microcell. Accordingly, a radio wave of a cell may be able to sufficiently reach another cell adjacent to the cell.

The sixteen cells G1-1 to G4-4 may be arranged as groups, each including N cells adjacent to one another. For example, N may be set to 4. N is an integer equal to or more than 2 and may be as large as 8. Four groups adjacent to one another, for example, a first group including the cells G1-1, G1-2, G1-3, and G1-4, a second group including the cells G2-1, G2-2, G2-3, and G2-4, a third group including the cells G3-1, G3-2, G3-3, and G3-4, and a fourth group including the cells G4-1, G4-2, G4-3, and G4-4, are generated. The grouping may be performed such that a cell is not included in a plurality of groups.

Figure 7:
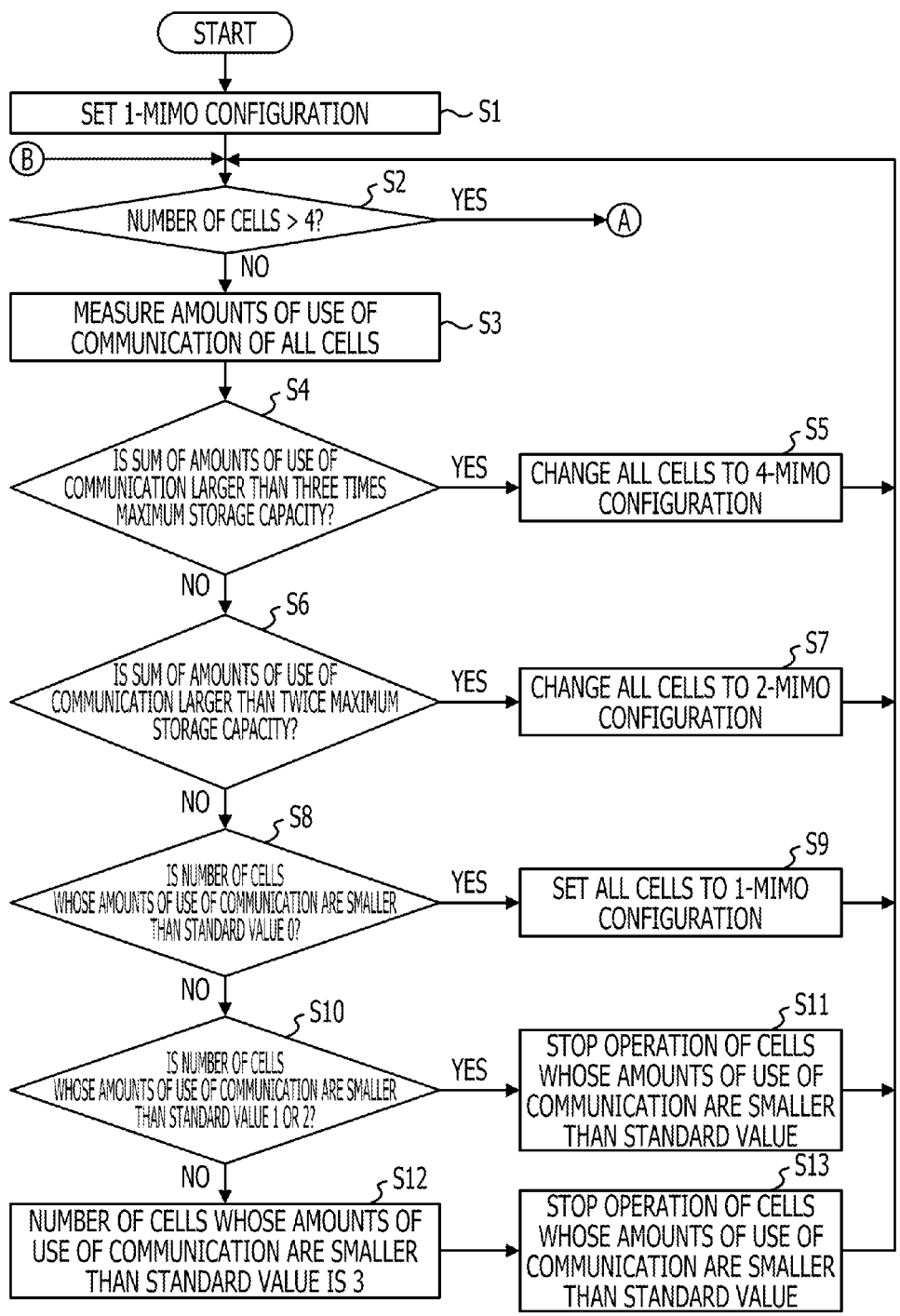
FIG. 7 illustrates an exemplary multiple-input and multiple-output (MIMO) setting process.
Figure 8:
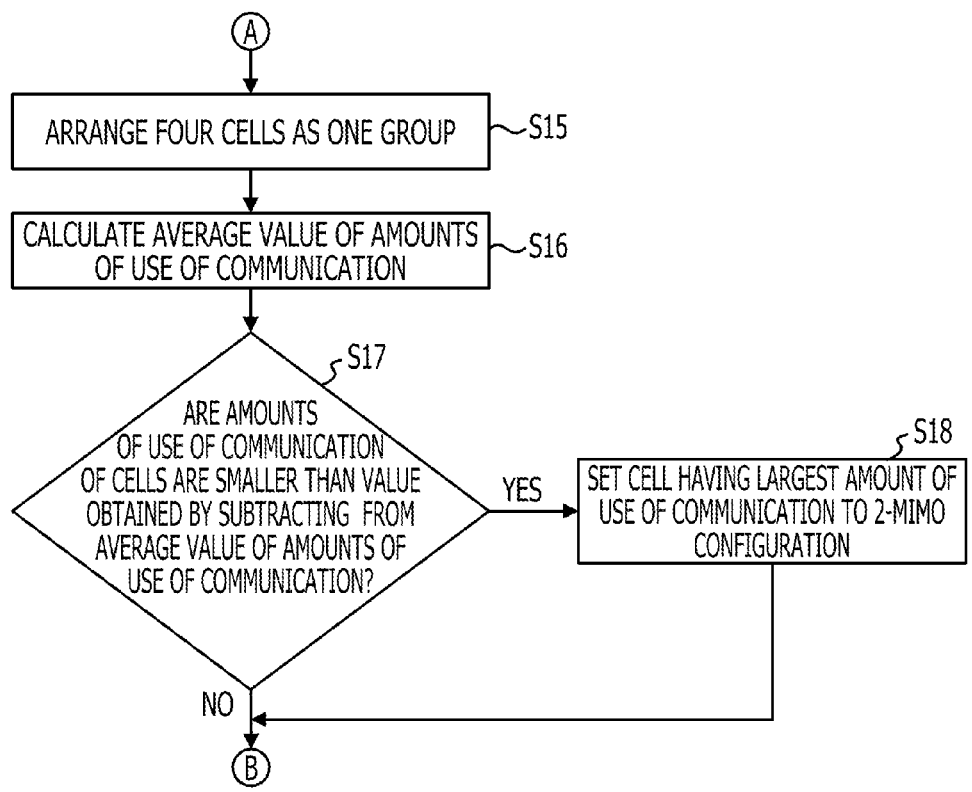
FIG. 8 illustrates an exemplary MIMO setting process.

FIGS. 7 and 8 illustrate an exemplary MIMO setting process. The monitoring control apparatus 4 illustrated in FIG. 2 or 3 may execute the MIMO setting process illustrated in FIGS. 7 and 8. The process illustrated in FIGS. 7 and 8 may be executed by the CPU 31. In an operation S1 illustrated in FIG. 7, the monitoring control apparatus 4 sets the transmission in the 1-MIMO configuration, in which a single antenna is used, for the base stations of all the cells. This setting may correspond to the initial setting.

In an operation S2, whether or not the number of cells adjacent to one another exceeds a certain number, for example, 4. The number of cells adjacent to one another may be a number set in advance in accordance with a service area. Since the number of cells included in each group is set as N=4, the certain number may be set to 4. If the number of cells adjacent to one another is less than or equal to 4, the process proceeds to an operation S3, and the amount of use of communication (the amount of data transferred) of each cell is integrated for the observation time T.

In an operation S4, whether or not the sum of the amounts (integrated values) of use of communication of the adjacent cells, the number of which is 4 at maximum including the cell executing this process, is larger than three times a maximum storage capacity CMAX of one cell is judged. The maximum storage capacity CMAX of one cell may correspond to a value obtained by integrating the maximum amount of use of communication transmitted by the base station of a cell using a single transmission antenna in the 1-MIMO configuration for the observation time $T_o$. The maximum amount of use of communication may be substantially the same between all the cells.

If the sum of the amounts (integrated values) of use of communication of the adjacent cells including the cell executing this process is larger than three times the maximum storage capacity CMAX, it may be judged that the amounts of use of communication of all the adjacent cells including the cell executing this process are increasing and large. In an operation S5, a MIMO control signal for instructing the base stations of all the cells to execute the transmission in the 4-MIMO configuration, in which four transmission antennas are used, is generated and transmitted to the base stations of all the cells. The process proceeds to the operation S2.

If the sum of the amounts (integrated values) of use of communication of the adjacent cells including the cell executing this process is less than or equal to three times the maximum storage capacity CMAX, whether or not the sum of the amounts (integrated values) of use of communication of the adjacent cells, the number of which is 4 at maximum including the cell executing this process, is larger than twice the maximum storage capacity CMAX of one cell is judged in an operation S6.

If the sum of the amounts (integrated values) of use of communication of the adjacent cells including the cell executing this process is larger than twice the maximum storage capacity CMAX, it may be judged that the amounts of use of communication of all the adjacent cells including the cell executing this process is increasing and large. In an operation S7, a MIMO control signal for instructing the base stations of all the cells to execute the transmission in the 2-MIMO configuration, in which two transmission antennas are used, is generated and transmitted to the base stations of all the cells. The process proceeds to the operation S2.

If the sum of the amounts (integrated values) of use of communication of the adjacent cells including the cell executing this process is less than or equal to twice the maximum storage capacity CMAX, whether the number of cells whose amounts (integrated values) of use of communication are smaller than a value obtained by subtracting the offset value a from the average value of the amounts (integrated values) of use of communication of the adjacent cells, the number of which is 4 at maximum including the cell executing this process, for example, a standard value, is 0 or not is judged in an operation S8.

When the observation time $T_o$ has been set as unit time and the maximum amount of use of communication of each cell in the unit time is assumed to be X [Mbps], a state in which the average value of the amounts of use of communication of the adjacent cells in the unit time is X/2 [Mbps] may be regarded as an ideal state. The offset value α may be, for example, set to about X/4 [Mbps].

If the number of cells whose amounts (integrated values) of use of communication are smaller than the value obtained by subtracting the offset value α from the average value of the amounts (integrated values) of use of communication of the adjacent cells is 0, it may be judged that the adjacent cells including the cell executing this process are being used in a substantially uniform manner. In an operation S9, a MIMO control signal for instructing the base stations of all the cells to execute the transmission in the 1-MIMO configuration, in which a single antenna is used, is generated and transmitted to the base stations of all the cells. The process proceeds to the operation S2.

In an operation S8, if the number of cells whose amounts (integrated values) of use of communication are smaller than the value obtained by subtracting the offset value α from the average value of the amounts (integrated values) of use of communication of the adjacent cells is other than 0 in an operation S8, whether the number of cells whose amounts (integrated values) of use of communication are smaller than the value obtained by subtracting the offset value α from the average value of the amounts (integrated values) of use of communication of the adjacent cells is 1 or 2 or not is judged in an operation S10.

If the number of cells whose amounts (integrated values) of use of communication are smaller than the value obtained by subtracting the offset value a from the average value of the amounts (integrated values) of use of communication of the adjacent cells is 1 or 2, it is judged that the amounts of use of communication of all the adjacent cells including the cell executing this process are decreasing. In an operation S11, the operation of the base stations of the cells whose amounts (integrated values) of use of communication are smaller than the value obtained by subtracting the offset value α from the average value is stopped. A MIMO control signal for instructing the base stations of the other cells, for example, the cells whose amounts (integrated values) of use of communication are larger than the value obtained by subtracting the offset value α from the average value, to execute the transmission in the 2-MIMO configuration, in which two transmission antennas are used, is generated and transmitted to the base stations of all the cells. The process proceeds to the operation S2. In order to cover mobile stations of customers located in the one or two cells whose operation has been stopped, the base stations of the other cells are set to the 2-MIMO configuration.

If the number of cells whose amounts (integrated values) of use of communication are smaller than the value obtained by subtracting the offset value α from the average value of the amounts (integrated values) of use of communication of the adjacent cells is other than 1 or 2, it is judged in an operation S12 that the number of cells whose amounts (integrated values) of use of communication are smaller than the value obtained by subtracting the offset value α from the average value of the amounts (integrated values) of use of communication of the adjacent cells is 3. The process proceeds to an operation S13.

In the operation S13, the operation of the base stations of the three cells whose amounts (integrated values) of use of communication are smaller than the value obtained by subtracting the offset value α from the average value is stopped. A MIMO control signal for instructing the base station of the other cell to execute the transmission in the 4-MIMO configuration, in which four transmission antennas are used, is generated and transmitted to the base stations of all the cells. The process proceeds to the operation S2. In order to cover mobile stations of customers located in the three cells whose operation has been stopped, the base station of the other cell may be set to the 4-MIMO configuration.

If the number of cells adjacent to one another exceeds 4 in the operation S2, the process proceeds to an operation S15 illustrated in FIG. 8. In the operation S15, the adjacent cells are arranged as groups, each including cells of N=4. For example, in FIG. 8, the cells may be arranged as four groups. In an operation S16, the amount of use of communication (the amount of data transferred) of each cell is integrated for the observation time $T_o$.

In an operation S17, cells whose amounts (integrated values) of use of communication are smaller than the value obtained by subtracting the offset value α from the average value of the amounts (integrated values) of use of communication of all the cells are searched for. Whether or not there is a group in which four cells all have amounts (integrated values) of use of communication smaller than the value obtained by subtracting the offset value α from the average value of the amounts (integrated values) of use of communication of all the cells is judged.

If there is a group in which four cells all have amounts (integrated values) of use of communication smaller than the value obtained by subtracting the offset value α from the average value, the operation of a cell having the largest amount (integrated value) of use of communication in the group is continued in an operation S18. The operation of the other three cells whose amounts (integrated values) of use of communication are smaller in the group is stopped. A MIMO control signal for instructing the base station of the cell whose operation has been continued to execute the transmission in the 2-MIMO configuration, in which two transmission antennas are used, is generated. The cell whose operation has been continued covers the three cells whose operation has been stopped. The process proceeds to an operation S2. In the operation S18, unlike the operation S13, the base station of the cell whose operation has been continued is set to the 2-MIMO configuration. Therefore, the transmission from an adjacent group to mobile stations located in the group including the cells whose operation has been stopped may be executed.

In the operation S17, if the amounts (integrated values) of use of communication of the four cells in the group are not smaller than the value obtained by subtracting the offset value α from the average value of the amounts (integrated values) of use of communication of all the cells, the process proceeds to the operation S2 illustrated in FIG. 7.

Figure 9:
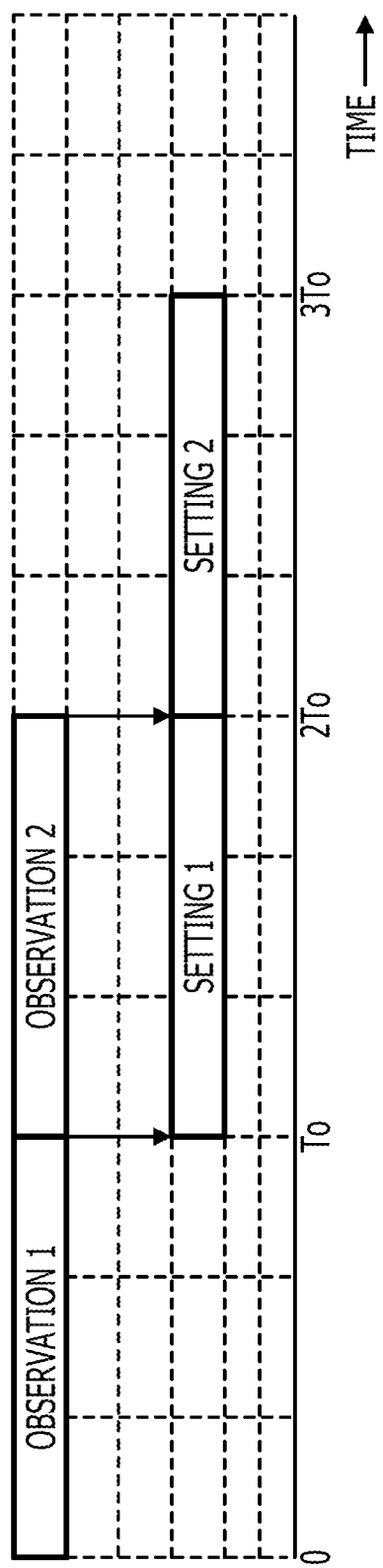
FIG. 9 illustrates an exemplary observation time.

FIG. 9 illustrates an exemplary observation time $T_o$. For a period between 0 and $T_o$ illustrated in FIG. 9, the amount of use of communication of each cell is integrated, and the MIMO setting process illustrated in FIGS. 7 and 8 is executed at the time $T_o$. For a period between $T_o$ and $2T_o$, the base station of each cell is set to the MIMO configuration. For the period between $T_o$ and $2T_o$, the amount of use of communication of each cell is integrated, and the MIMO setting process illustrated in FIGS. 7 and 8 is executed at the time $2T_o$. For a period between $2T_o$ and $3T_o$, the base station of each cell is set to the MIMO configuration.

The longer the observation time $T_o$, the more accurate the recognition of the communication state of each cell by the monitoring control apparatus 4 may be. When the observation time $T_o$ is short, the amount of use of communication of the base station of each cell may vary. The longer the observation time $T_o$, the later the completion of the setting of the base station of each cell according to the current communication state may be. Therefore, it may be difficult to adjust to a sharp increase or decrease in the number of calls.

Figure 10:
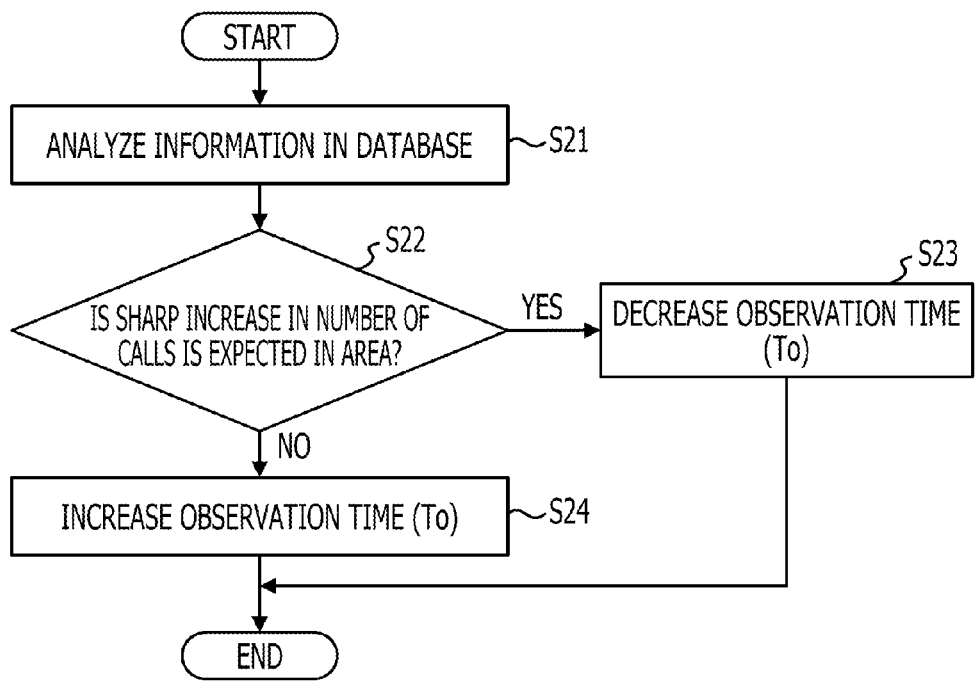
FIG. 10 illustrates an exemplary process for setting the observation time.

FIG. 10 illustrates an exemplary process for setting the observation time $T_o$. The observation time setting unit 14 illustrated in FIG. 2 may execute the setting process illustrated in FIG. 10. The process illustrated in FIG. 10 may be executed by the CPU 31 illustrated in FIG. 3. The setting process may be executed every time a certain period of time elapses. In an operation S21, the observation time setting unit 14 reads, from the database 10, the amounts of use of communication transmitted from the base stations of the adjacent cells, and analyzes changes in the amounts of use of communication of the adjacent cells.

In an operation S22, whether or not the adjacent cells are located in an area in which a sharp increase in the number of calls is expected is judged. The area in which a sharp increase in the number of calls is expected may be an area in which the number of customers has changed at certain time intervals, such as a movie theater or a theater.

If the adjacent cells are located in an area in which a sharp increase in the number of calls is expected, the observation time $T_o$ is decreased by a certain ratio in an operation S23. If the adjacent cells are not located in an area in which a sharp increase in the number of calls is expected, the observation time $T_o$ is increased by a certain ratio in operation S24.

The observation time $T_o$ may be set by an operation of the manager.

Figure 11:
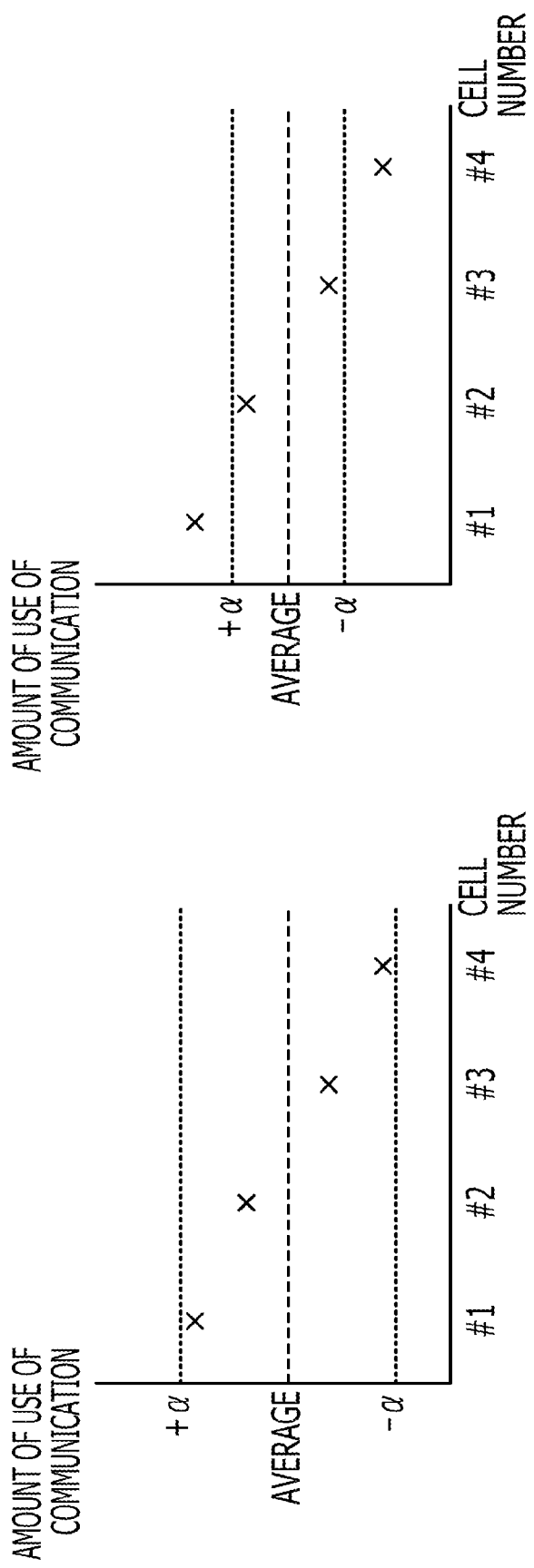
FIGS. 11A and 11B illustrate an exemplary amount of use of communication.

FIGS. 11A and 11B illustrate an exemplary amount of use of communication. Cells whose amounts (integrated values) of use of communication are smaller than the value obtained by subtracting the offset value α from the average value of the amounts (integrated values) of use of communication of the adjacent cells may be searched for. In FIG. 11A, the offset value α may be too large. The amounts of use of communication of the cells #1 to #4 may be larger than the value obtained by subtracting the offset value α from the average value.

In FIG. 11B, the offset value α may be appropriate. The cell #4, whose amount of use of communication is smaller than the value obtained by subtracting the offset value α from the average value, may be detected.

Figure 12:
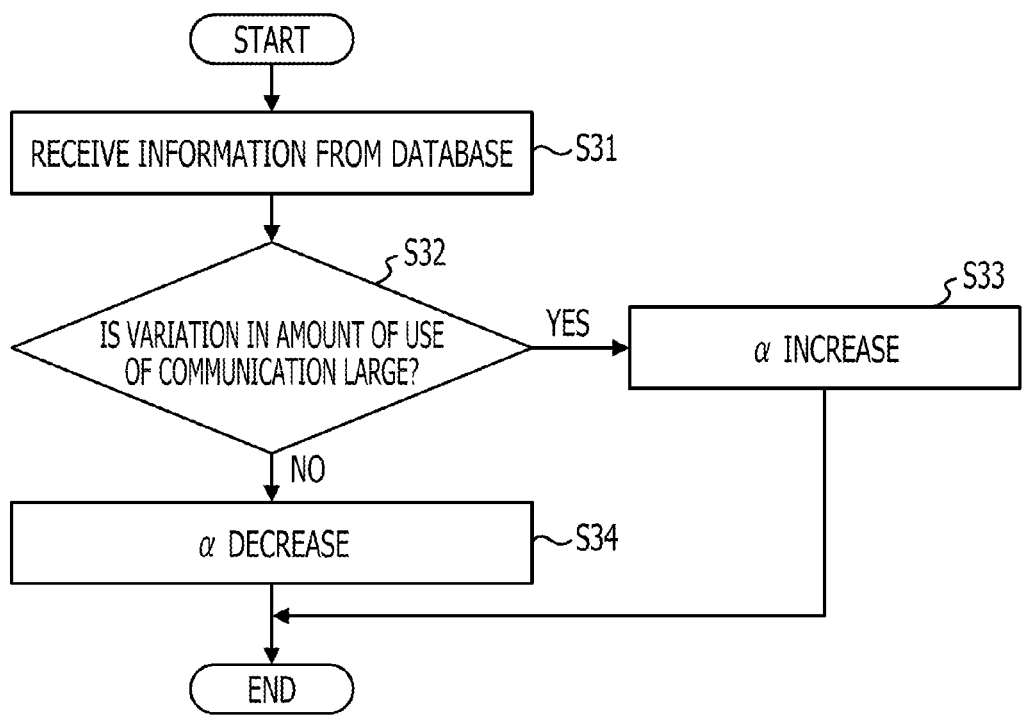
FIG. 12 illustrates an exemplary process for setting an offset value.

FIG. 12 illustrates an exemplary process for setting the offset value α. The setting process illustrated in FIG. 12 may be executed by the offset setting unit 15. The process illustrated in FIG. 12 may be executed by the CPU 31 illustrated in FIG. 3. The setting process may be executed every time a certain period of time elapses. In an operation S31, the offset setting unit 15 reads, from the database 10, the amounts of use of communication transmitted from the base stations of the adjacent cells and information regarding the MIMO configurations of the base stations of the adjacent cells. Variation in the amount of use of communication between the adjacent cells, for example, the variance of the amounts of use of communication of the adjacent cells is analyzed.

In an operation S32, whether or not variation in the amount of use of communication between the adjacent cells is large, for example, whether or not the value of variance is larger than a certain value is judged. If variation in the amount of use of communication between the adjacent cells is large, the offset value α, which serves as an indicator of variation, is increased by a certain ratio in an operation S33. If variation in the amount of use of communication between the adjacent cells is not large, the offset value α is decreased by a certain ration in an operation S34.

In an area in which changes in the amount of use of communication are significant, for example, in an area in which the amount of use of communication in the daytime is large but sharply decreases at night, such as a city, the offset value α may be set to be relatively large. In a base station in which a high-order MIMO configuration is used, the offset value α may be set to be large. For example, in a rural area, the amount of use of communication temporarily increases due to an assembly or the like, but the difference is small. Therefore, the offset value α may be set to be small.

The offset value α may be set by an operation of the manager.

As illustrated in FIG. 6, for example, the cells G1-1, G1-2, G1-3, and G1-4 may be arranged as a first group. In the operation S18 illustrated in FIG. 8, the cell G1-1 in the first group may be operated, and the operation of the cells G1-2, G1-3, and G1-4 may be stopped. The traffic in the cells G1-2, G1-3, and G1-4 may be covered by the base station of the cell G1-1.

The traffic in a cell whose operation has been stopped, for example, the cell G1-2, may become larger than that in the cell G1-1. The single cell to be operated may be switched, for example, from the G1-1 to the cell G1-2, to the cell G1-3, and then to the cell G1-4, at certain time intervals, for example, at intervals of several minutes to tens of minutes. The single cell to be operated is switched to the cell G1-1 from the cell G1-4, thus continuing the switching at the certain time intervals. All the areas may be efficiently covered.

Figure 13:
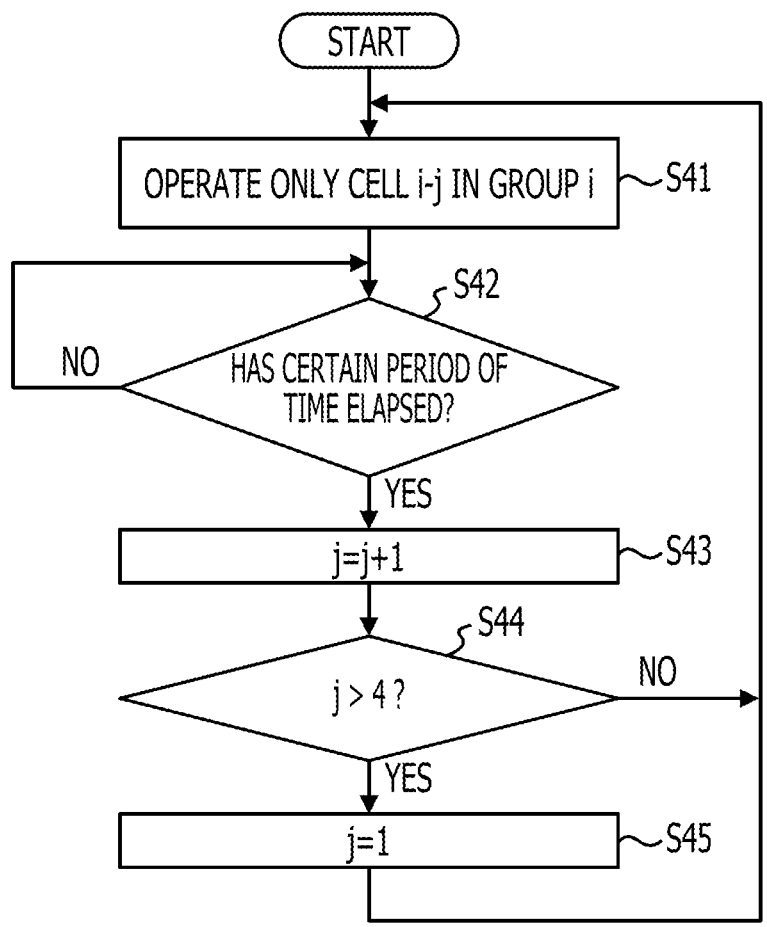
FIG. 13 illustrates an exemplary process for switching a single cell operation.

FIG. 13 illustrates an exemplary process for switching a single cell operation. The switching operation may be executed within a group. The switching process may be executed after operation S18 illustrated in FIG. 8. The operation illustrated in FIG. 13 may be executed by the CPU 31. In an operation S41, there is a group i (i is an integer equal to or more than 1), and a cell i-j (j is an integer from 1 to 4) in the group i is operated. For example, in the operation S18 illustrated in FIG. 8, i and j may be set for the cell H.

In an operation S42, whether or not a certain period of time has elapsed is judged. If the certain period of time has elapsed, the process proceeds to an operation S43, and j is increased by 1. In an operation S44, whether or not j exceeds 4 is judged. If j exceeds 4, j is set to 1 in an operation S45. After operation S45 or if j is less than or equal to 4 in the operation S44, the process proceeds to the operation S41.

A base station whose amount of use of communication is small is searched for and the operation of the found base station is stopped. Since the operation of the base station whose operation has been stopped is covered by another base station, the frequency may be efficiently used and the power consumption of the entirety of the mobile communication system may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of managing a mobile communication system in which a base station and a mobile station communicate with each other, the method comprising:
   operating first cells, which are included in a plurality of base stations, located adjacent one another;
   grouping a certain lumber of the first cells when a number of cells of the plurality of base stations exceeds the certain number;
   measuring an amount of use of communication of the first cells;
   making all of the first cells operate using one of a plurality of multi-input and multi-output configurations based on a degree to which a total amount of use of communication of the first cells is larger than a maximum value; and
   stopping one or more second cells included in the first cells when the total amount of use of communication is less than or equal to a first reference value and the one or more second cells have amounts of use of communication that are smaller than a second reference value based on an average value of the amounts of use of communication of the first cells.

2. The method according to claim 1, further comprising,
   setting an order of the multi-input and multi-output configuration based on the number of cells whose operation is stopped.

3. The method according to claim 2, wherein the order of the multi-input and multi-output configuration is set to be larger as the number of cells whose operation is stopped becomes larger.

4. The method according to claim 1, further comprising:
   making at least one cell in a group operate using a high-order multi-input and multi-output configuration when the amounts of use of communication of the cells in the group are smaller than a third reference value.

5. A monitoring control apparatus for a mobile communication system in which a base station and a mobile station communicate with each other, the monitoring control apparatus comprising:
- a collection unit to collect amounts of use of communication from cells of a plurality of base stations; and
- a control unit to:
  - operate first cells, which are included in a plurality of base stations, located adjacent one another,
  - group a certain number of the first cells when a number of cells of the plurality of base stations exceeds the certain number;
  - measure an amount of use of communication of the first cells:
  - make all of the first s operate using one of a plurality of multi-input and multi-output configurations based on a degree to which a total amount of use of communication of the first cells is larger than a maximum value, and
  - stop one or more second cells included in the first cells when the total amount of use of communication is less than or equal to a first reference value and the one or more second cells have amounts of use of communication that smaller than a second reference value based on an average value of the amounts of use of communication of the first cells.

6. The monitoring control apparatus according to claim 5, wherein the control unit sets an order of the multi-input and multi-output configuration based on the number of cells whose operation is stopped.

7. The monitoring control apparatus according to claim 6, wherein the control unit sets the order of the multi-input and multi-output configuration to be larger as the number of cells whose operation is stopped becomes larger.

8. The monitoring control apparatus according to claim 5, wherein the control unit
- is further configured to make at least one cell in the group operate using a high-order multi-input and multi-output configuration when the amounts of use of communication of the cells in the group are smaller than a third reference value.

9. The monitoring control apparatus according to claim 8, wherein the intra-group control section sequentially switch the cell to be operated using the high-order multi-input and multi-output configuration in the group at certain time intervals.

10. The monitoring control apparatus according to claim 5, wherein the amounts of use of communication are values obtained by integrating the amounts of data transferred or the numbers of customers who are communicating for a certain period of time, and
- wherein the second reference value is a value obtained by subtracting an offset value from an average value of the amounts of use of communication of the cells of the plurality of base stations.

11. The monitoring control apparatus according to claim 10, further comprising,
- a time setting unit to set the certain period of time for which the amounts of data transferred or the numbers of customers who are communicating are integrated.

12. The monitoring control apparatus according to claim 10, further comprising,
- an offset setting unit to set the offset value.

* * * * *